United States Patent [19]
Benthin

[11] Patent Number: 5,766,396
[45] Date of Patent: Jun. 16, 1998

[54] WORKING PROCESS FOR PRODUCING POCKETS AT THE ENDS OF SLATS OF A WEB OF SLATS MADE OF FLEXIBLE MATERIAL AND DEVICE FOR CARRYING OUT THIS WORKING PROCESS

[75] Inventor: Siegfried Benthin, Bremerhaven, Germany

[73] Assignee: Benthin Aktiengesellschaft, Bremerhaven, Germany

[21] Appl. No.: 661,392

[22] Filed: Jun. 7, 1996

[30] Foreign Application Priority Data

Jun. 10, 1995 [DE] Germany .................. 195 21 283.5

[51] Int. Cl.[6] ........................................ B32B 31/00
[52] U.S. Cl. ............... 156/228; 156/290; 156/308.4; 156/539; 156/580
[58] Field of Search ........................ 156/228, 290, 156/308.2, 308.4, 538, 539, 580, 583.1

[56] References Cited

U.S. PATENT DOCUMENTS 3,986,914  10/1976  Howard ..................... 156/251
4,310,376  1/1982  Ebina et al. ................ 156/499
4,931,115  6/1990  Pajunen ..................... 156/73.1
5,628,863  5/1997  Lee .......................... 156/353

FOREIGN PATENT DOCUMENTS

A-2 182 245  4/1973  France .
2 031 305  12/1971  Germany .
43 08 405 C1  1/1994  Germany .

Primary Examiner—James Sells
Attorney, Agent, or Firm—McGlew and Tuttle

[57] ABSTRACT

A working process for producing pockets at the ends of slats of a slat web made of a flexible material and to a device for carrying out this process. The essential feature is the arrangement of a feeding device, by means of which the section of a web-like welding flux needed for a welding process can be inserted transversely to the longitudinal direction of the slat from the side into the partially open slat pocket, and the welding flux is fed at a linear distance.

10 Claims, 3 Drawing Sheets

WORKING PROCESS FOR PRODUCING POCKETS AT THE ENDS OF SLATS OF A WEB OF SLATS MADE OF FLEXIBLE MATERIAL AND DEVICE FOR CARRYING OUT THIS WORKING PROCESS

FIELD OF THE INVENTION

The present invention pertains to a working process for producing pockets at the ends of slats of a web of slats made of a flexible material, especially slats of a vertical Venetian blind, using a welding flux, which is to be inserted between the surface sections of the slat web that are to be welded to one another, the welding material (flux) being preferably made of plastic that is plastically deformable under the effect of heat and pressure, and which is fed in sections in a web like manner from a supply coil and is separated from the material web after carrying out the welding process. The present invention also pertains to the development of a device, which is suitable, among other things, for carrying out this working process.

BACKGROUND OF THE INVENTION

In a working process for producing inserted pockets for weights at the lower ends and for the slat holder at the upper ends of the slats of a vertical Venetian blind, which has become known from German Patent No. DE 43 08 405 - C1, the welding flux running off a supply coil as a web, e.g., a plastic film or a plastic fabric, is fed to a pressure strip from an initial setting above the slat pocket inserted into a pocket mount, is grasped from below by this pressure strip and is pivoted with a pivoting movement of about 90° together with the pressure strip into the partially open slat pocket, so that the pressure strip subsequently returns to its initial position, before the actual welding process using two heatable and mutually movable welding dies can begin and the welding end of the welding flux is subsequently able to be separated from the web to the supply coil.

For carrying out this prior-art working process, the same patent discloses a device, in which the free end of the welding flux is arranged in a vertically offset manner in the initial setting at the welding station, which is formed by heating dies, and a pressure strip is provided, which is able to pivot under the freely projecting end of the welding flux and is guided in a vertically movable manner on a housing together with the end of the welding flux. For performing the pivoting movement of the pressure strip, this pressure strip is arranged at a rocker, which is pivotable about a horizontal transverse axis, so that the pressure strip pivots the free end of the welding flux into the partially open slat pocket upon actuation of the rocker.

SUMMARY AND OBJECTS OF THE INVENTION

The primary object of the present invention is to achieve a higher accuracy in the working result, an increase in the throughput capacity, as well as a simplified device in the mechanical production of slat pockets, especially of slat pockets at the ends of slats made of flexible material, as they are used for vertical Venetian blinds.

According to the invention, a working process is provided for the production of pockets at the ends of slats of a slat web made of a flexible material, using a welding flux, which is inserted between the surface sections of the slat web that are to be welded to one another. The welding material is made of plastic that is plastically deformable under the effective heat and pressure. The welding material is fed in sections in a web-like manner from a supply coil and is separated from the material web after carrying out the welding process. The welding flux is fed in sections laterally adjacent to the slat pocket and then the fed end of the welding flux is inserted into a partially opened slat pocket of the sections of slat web from a side by means of a movement transversed to the longitudinal direction of the web of slats.

The process further preferably includes inserting the fed end of the material web of the welding flux during the feeding into the partially opened slat pocket between protective strips wherein the protective strips are subsequently pulled out approximately in a straight line from a surface section of the slat web to be welded.

According to the invention, a device is provided for welding pockets to slats made of a flexible material using a welding flux (welding material) made of a plastic that is plastically deformable under the effective pressure and heat. A feeding device is provided which gradually positions and at the same time portions out the welding flux in the needed size between two sections of a slat web. The welding flux (thermoplastic welding material) is inserted into a pocket mount in an area of oppositely movable welding dies in an operating cycle of the welding device. A feeding device is arranged in a cross sliding manner transversed to the longitudinal direction of the slat web. The feeding device extends from a position adjacent to the slat web up to a position overlapping the slat web. The feeding device includes conveying means for the welding flux, including diaphragm clamps which convey the welding flux by a feed length of the welding flux section needed for an operating cycle.

The feeding device is preferably displaceably arranged on at least one cross member of a frame transversed to a longitudinal direction of the slat, for welding the flux web. The flux web unwinds from a supply coil and is guided on a guiding means. A pocket mount is preferably guided in a moveable manner in the frame in a longitudinal direction of the slat and is displaceable with a welding zone of the slat pocket up to between the welding dies, which can be vertically moved opposite one another. The conveying members of the feeding device preferably consist of two diaphragm clamps which can be activated alternately, one of which is guided in a movable manner by a feed length of the welding flux, opposite the other during the operating cycle of the welding device. A clamping plane of the two diaphragm clamps is preferably arranged in alignment with the slat pocket, which is inserted into the pocket mount, and the diaphragm clamp, which is adjacent the welding dies has a support for an end of the web of the welding flux, which can be pushed between the open welding dies. The support of the diaphragm clamp, which is adjacent to the welding dies, and a protective strip, which is arranged above it at a slight distance, pick-up the welding flux between them during the lateral feeding into the slat pocket and can be pulled out together transversely to the longitudinal direction of the slat lab.

The pocket mount of the feeding unit is preferably arranged in a movable manner that is limited in terms of height. Pneumatic cylinders are preferably provided (pneumatically impacted piston-cylinder units) for the drive of the movable diaphragm clamp and the pocket mount. The pneumatic cylinders preferably have a common program control that is coordinated with the operating cycle of the device.

Linear movements during the insertion of the welding flux (thermoplastic welding material) into the partly open slat pocket and likewise linear feed movements for the dimensioning of the section of the welding flux necessary for a welding process are made possible by means of the features according to the present invention. Such movements are to be made with high precision using relatively simple machine components. Another advantage of the features according to the present invention is that the feed movement of the welding flux for dimensioning the section of this welding flux necessary for the next welding process takes place laterally next to the slat web and the slat pocket, so that this feed movement for the welding flux and the insertion of a slat pocket into a pocket mount of the device are able to take place at the same time, by means of which the throughput capacity of the device is increased. The insertion of the slat pocket into the pocket mount of the device is not covered by other machine components, so that a good monitoring of the correct position of the slat pocket in the pocket mount is provided.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
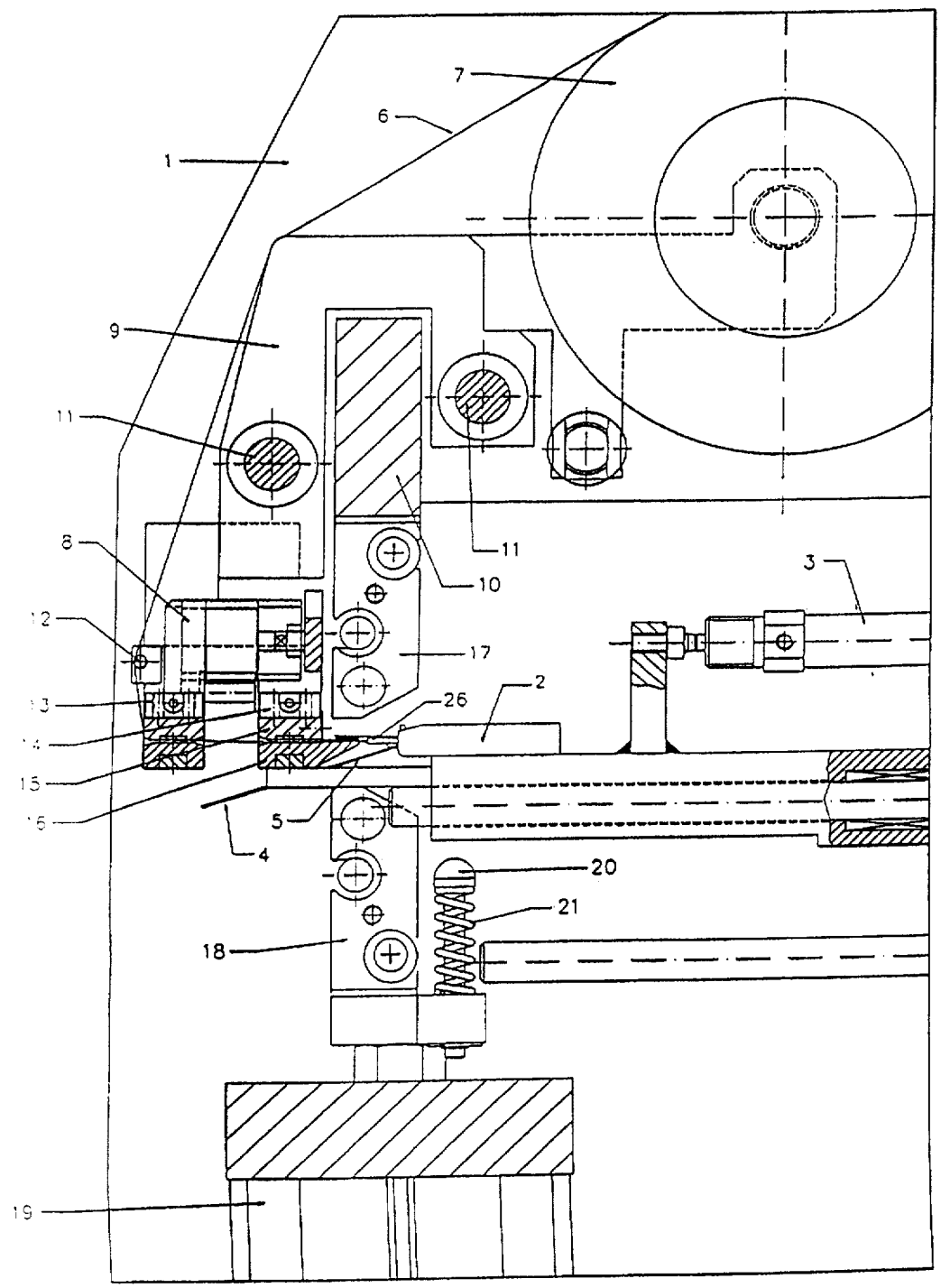
FIG. 1 is a cross sectional of a device having the features according to the present invention.
Figure 2:
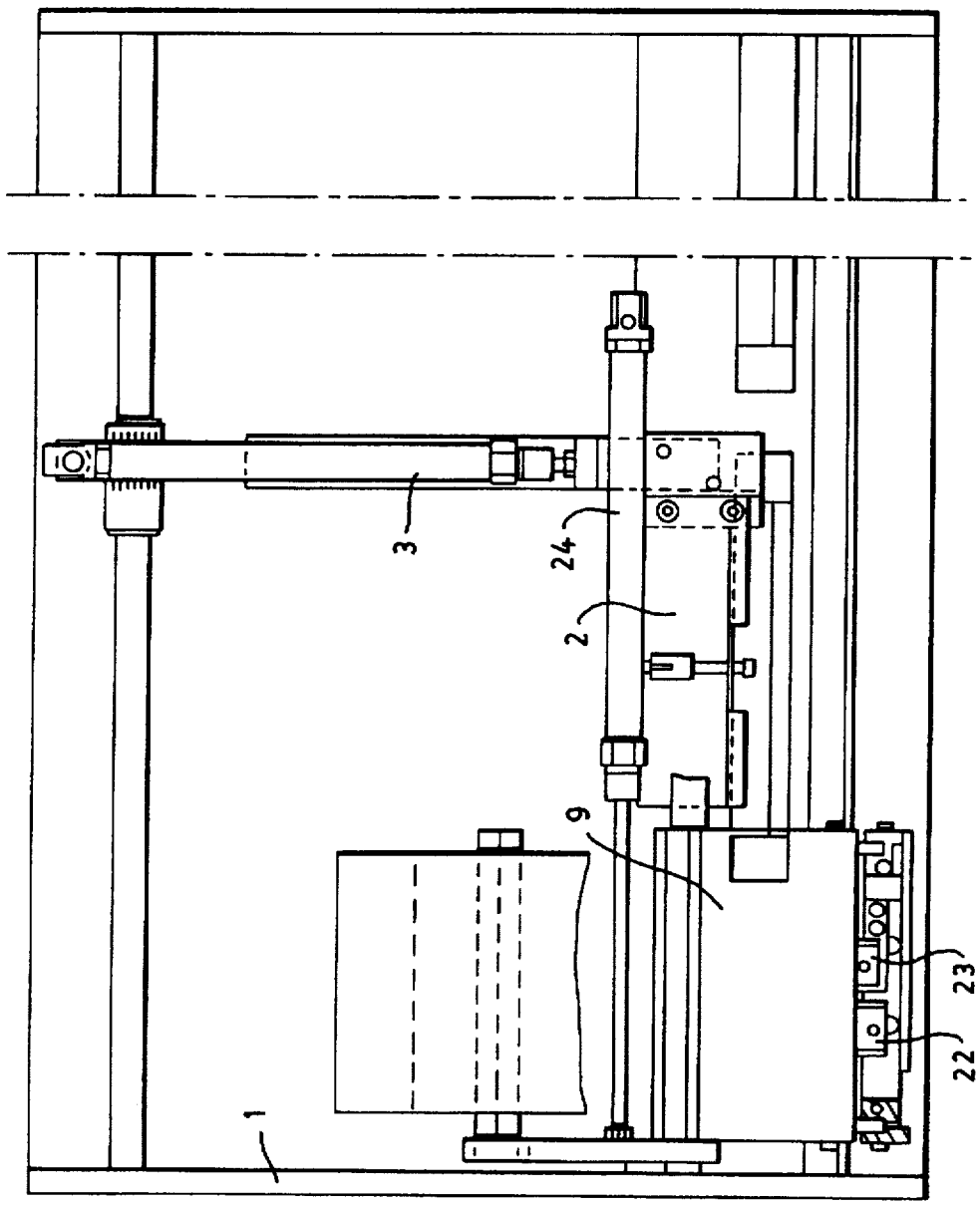
FIG. 2 is a partial top view of the device according to FIG. 1 on a reduced scale, wherein various machine components were omitted for reasons of better clarity.
Figure 3:
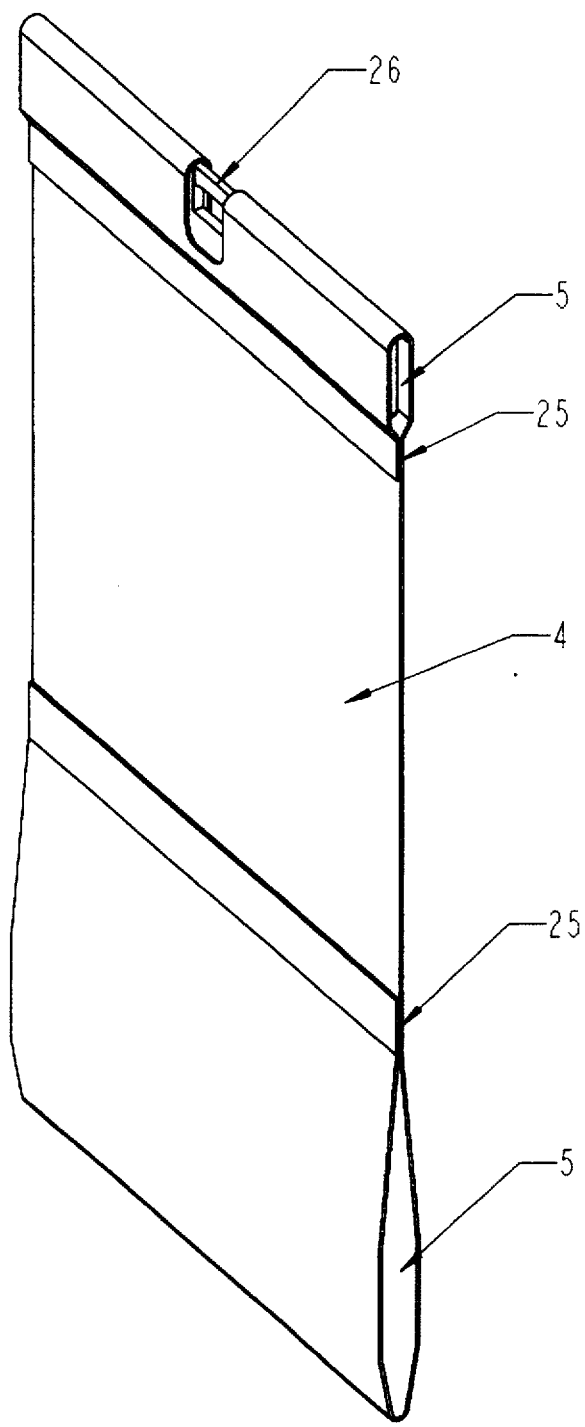
FIG. 3 is a three dimensional view of a slat typically produced with a process and a device having the features according to the present invention.

FIG. 3 shows a slat 4 typically produced on a device as shown in FIGS. 1 and 2. On its lower end the slat 4 has a slat pocket 5 for a weight and on its upper end a slat pocked 5 for a slat holder 26. The slat pocket 5 is produced by folding a end portion of the slat 4 and welding it to the slat 4 at 25. The present invention deals with welding of welding seam 25.

At the upper end the end portion of the slat 4 is folded around the slat holder 26 thereby inserting it into the pocket 5. At the lower end the end portion of the slat 4 is folded around a folding blade (not shown) which is part of the device. FIG. 1 shows the device while producing the upper slat pocket 5 for the slat holder 26.

In a frame 1 of the device according to the invention, a pocket mount 2 is guided in a horizontally movable manner and is able to be driven by means of a pneumatic cylinder 3, so that, from the position shown in FIG. 1 on the operating side of the machine, the pocket mount is able to be driven out and to be pulled back again a short distance from the machine. A feeding unit 8, which is arranged at a carriage 9, is then located laterally next to the pocket mount 2. The slat 4 with the slat pocket 5 partly open and usually formed by folding back, is inserted into this pocket mount 2 in the exact position. Two slat sections of the slat web form the open slat pocket. The welding flux (thermoplastic welding material) is separated from a welding flux web 6 (web of thermoplastic welding material), which runs off a supply coil 7. In the example shown, the feeding device 8 for the welding flux 6, which is fed in a web-like manner, comprises a deflecting means 12 for deflecting the welding flux web 6, a fixed diaphragm clamp 13, a diaphragm clamp 14 guided in a movable manner, protective strips 15 and 16, as well as pneumatic cylinders 22 and 23 for the drive, and additional components. The carriage 9, which supports the feeding unit 8, is arranged on a cross member 19, is additionally guided in a movable manner on guiding means 11 of the frame 1 transversely to the longitudinal direction of the slat 4 and, e.g., is able to be driven by means of the pneumatic cylinder 24 in the operating cycle of the device. Via a deflecting means 12, the web 6 of the welding flux reaches into a diaphragm clamp 13, which is arranged in a fixed manner at the carriage 9, and from there into a second diaphragm clamp 14, which, opposite the diaphragm clamp 13, is arranged in a movable manner opposite the carriage 9 approximately at the level of the pocket mount. The distance of the movement of the diaphragm clamp 14 and of the protective strips 15 and 16 opposite the fixed diaphragm clamp 13, which is brought about by means of the pneumatic cylinders 22 and 23, produces the feed of the section of the welding flux needed for a welding process and for the separation movement. The feed takes place by means of alternate impact on the diaphragm clamps 13 and 14 (the conveying members), by means of which the web 6 of the welding flux is alternately clamped, and for the separation movement of the section of the welding flux needed for a welding process. The fed, free end of the flux is guided by means of protective strips 15 and 16, which are located at the feeding device 8. Together with this guiding means by means of the protective strips 15 and 16, the section of the welding flux needed for a welding process is inserted from the side into the welding station from the two welding dies 17 and 18 into the partially open slat pocket 5. Thereafter, the open diaphragm clamp 14 and the protective strips 15 and 16 move horizontally in the longitudinal direction of the slat 4, by means of which the fed section of the welding flux is released so that now the welding process takes place. In the exemplary embodiment shown, the lower welding die 18 can be moved upwards against the fixed welding die 17 by means of a pneumatic cylinder 19. At the same time, an optionally necessary height adjustment with respect to the position of the pocket mount 2 and of the protective strips 15 and 16 of the feeding unit 8 takes place during the lifting movement of the welding die 18 by means of a rod 20, which is connected to the welding die and which is spring-mounted by means of a coil spring 21. Both the pocket mount and the feeding unit may also be arranged in a movable manner that is limited in terms of height.

While specific embodiments of the invention have been shown and described in detail to illustrate the application of the principles of the invention, it will be understood that the invention may be embodied otherwise without departing from such principles.

What is claimed is:

1. A process for the production of a pocket at an end of a slat of a slat web made of flexible material, comprising the steps of:

providing thermoplastic welding material;

providing feed means for positioning and portioning out said thermoplastic welding material in a needed size between two sections of the slat web, said feed means being arranged in a cross-sliding manner, transverse to a longitudinal direction of said slat web from a position adjacent to said slat web up to a position overlapping said slat web, said feed means including conveying members for conveying said thermoplastic welding material;

providing a pocket mount with oppositely movable dies, said two sections of slat web being inserted into said pocket mount in an area of said oppositely movable welding dies in an operating cycle of the device by a feed length of said thermoplastic welding material section needed for each operating cycle;

inserting said thermoplastic welding material between said two sections of said slat web which are to be welded to one another, said thermoplastic welding material being formed of plastic and being plastically deformable under the effective heat and pressure including;

feeding an end of said thermoplastic welding material in sections in a web-like manner from a supply coil to a position laterally adjacent the pocket;

inserting a fed end of said thermoplastic material into said pocket from said sections of said slat web from a side by means of a movement transverse to a longitudinal direction of said web of slats and separating said thermoplastic material web after welding.

2. A process according to claim 1, wherein said fed end of said thermoplastic material, during said step of feeding said thermoplastic material into said pocket, is inserted between protective strips, said protective strips being subsequently pulled out approximately in a straight line from a surface section of said slat web to be welded.

3. A device for welding pockets to slats made of flexible material using a thermoplastic welding material that is plastically deformable under the effective pressure and heat, the device comprising:

feed means for positioning and portioning out said thermoplastic welding material in a needed size between two sections of slat web;

a pocket mount, said two sections of slat web being inserted into said pocket mount in an area of said oppositely movable welding dies in an operating cycle of the device, said feed means being arranged in a cross-sliding manner, transverse to a longitudinal direction of said slat web from a position adjacent to said slat web up to a position overlapping said slat web, said feed means including conveying members for conveying said thermoplastic welding material by a feed length of said thermoplastic welding material section needed for each operating cycle.

4. Device in accordance with claim 3, further comprising a frame with a cross member, said feed means being displaceably arranged on said cross member on said frame, transverse to a longitudinal direction of said slat web; guide means for guiding said thermoplastic material web; and a supply coil for said welding thermoplastic welding material web, said welding thermoplastic welding material web unwinding from a said supply coil and being guided by said guiding means.

5. Device in accordance with claims 4, further comprising oppositely moving welding dies, said pocket mount being guided in a movable manner in said frame in the longitudinal direction of said slat and being displaceable with a welding zone of said slat pocket up to a location between said welding dies, which can be vertically moved opposite one another.

6. Device in accordance with the claims 4 wherein said conveying members of said feeding device includes two diaphragm clamps, which can be activated alternately, one of which is guided in a movable manner by a feed length of the said welding flux opposite the other during an operating cycle of the device.

7. Device in accordance with claim 5, wherein a clamping plane of said two diaphragm clamps is arranged in alignment with a slat pocket of a slat, which is inserted into the said pocket mount, and one of said diaphragm clamps, which is adjacent to the said welding dies, has a support for an end of said web of the welding flux, said support being pushable into open welding dies.

8. Device in accordance with the claim 7, wherein said support of said diaphragm clamp, which is adjacent to the said welding dies, and a protective strip, which is arranged above said support at a slight distance, pick up said welding flux between them during the lateral feeding into said slat pocket and can be pulled out together transversely to the longitudinal direction of the slat web.

9. Device in accordance with the claim 3, wherein said pocket mount and said feeding unit are arranged in a movable manner that is limited in terms of height.

10. Device in accordance with the claims 3, further comprising pneumatically impactable piston-cylinder units provided for driving of said movable diaphragm clamp and of said pocket mount, and common program means for controlling that is coordinated with the operating cycle of the device.

* * * * *